United States Patent
Tinsley et al.

(10) Patent No.: US 6,967,956 B1
(45) Date of Patent: Nov. 22, 2005

(54) METHODS AND SYSTEMS FOR PROVIDING MESSAGE TRANSLATION, ACCOUNTING AND ROUTING SERVICE IN A MULTI-PROTOCOL COMMUNICATIONS NETWORK ENVIRONMENT

(75) Inventors: Robert John Tinsley, Durham, NC (US); Peter Joseph Marsico, Carrboro, NC (US); David Michael Sprague, Raleigh, NC (US)

(73) Assignee: Tekelec, Calabasas, CA (US)

( * ) Notice: Subject to any disclaimer, the term of this patent is extended or adjusted under 35 U.S.C. 154(b) by 211 days.

(21) Appl. No.: 09/618,807

(22) Filed: Jul. 18, 2000

(51) Int. Cl.[7] .............................. H04J 3/16; H04J 3/22
(52) U.S. Cl. ...................... 370/401; 370/410; 370/466
(58) Field of Search ................................ 370/351–356, 370/401, 410, 464, 465, 466, 467; 709/230

(56) References Cited

U.S. PATENT DOCUMENTS

| | | |
|---|---|---|
| 5,008,929 A | 4/1991 | Olsen et al. |
| 5,142,622 A | 8/1992 | Owens |
| 5,208,811 A | 5/1993 | Kashio et al. |
| 5,239,542 A | 8/1993 | Breidenstein et al. |
| 5,315,641 A | 5/1994 | Montgomery et al. |
| 5,384,840 A | 1/1995 | Blatchford et al. |
| 5,420,916 A | 5/1995 | Sekiguchi |
| 5,430,727 A | 7/1995 | Callon |
| 5,509,010 A | 4/1996 | La Porta et al. |
| 5,568,487 A | 10/1996 | Sitbon et al. |
| 5,581,558 A | 12/1996 | Horney, II et al. |
| 5,583,927 A | 12/1996 | Ely et al. |
| 5,586,177 A | 12/1996 | Farris et al. |
| 5,638,431 A | 6/1997 | Everett et al. |
| 5,640,446 A | 6/1997 | Everett et al. |
| 5,651,002 A | 7/1997 | Van Seters et al. |
| 5,657,452 A | 8/1997 | Kralowetz et al. |
| 5,664,102 A | 9/1997 | Faynberg |
| 5,675,635 A | 10/1997 | Vos et al. |
| 5,680,552 A | 10/1997 | Netravali et al. |
| 5,696,809 A | 12/1997 | Voit |
| 5,701,301 A | 12/1997 | Weisser, Jr. |
| 5,706,286 A | 1/1998 | Reiman et al. |
| 5,712,903 A | 1/1998 | Bartholomew et al. |
| 5,732,213 A | 3/1998 | Gessel et al. |
| 5,740,374 A | 4/1998 | Raffali-Schreinemachers |
| 5,761,281 A | 6/1998 | Baum et al. |
| 5,761,500 A | 6/1998 | Gallant et al. |
| 5,764,750 A | 6/1998 | Chau et al. |

(Continued)

FOREIGN PATENT DOCUMENTS

EP    0 853 411 A2    7/1998

(Continued)

OTHER PUBLICATIONS

Handley et al., "SIP: Session Initiation Protocol," Internet draft, Network Working Group, p. 1-141, (Mar. 1, 1999).

(Continued)

*Primary Examiner*—Ajit Patel
(74) *Attorney, Agent, or Firm*—Jenkins, Wilson & Taylor, P.A.

(57) ABSTRACT

A network element that is capable facilitating the routing and accounting of messages between a plurality of network elements that do not share a common signaling application protocol nor a common transport protocol suite. In one embodiment of the present invention, a Multi-Protocol Gateway (MPG) is adapted to receive a signaling message and subsequently translate both the signaling and transport protocol suite prior to message routing. The MPG node is also configured to create and maintain usage and measurements data that may subsequently be used to produce billing records.

61 Claims, 9 Drawing Sheets

U.S. PATENT DOCUMENTS

| | | |
|---|---|---|
| 5,764,955 A | 6/1998 | Doolan |
| 5,768,361 A | 6/1998 | Cowgill |
| 5,768,525 A | 6/1998 | Kralowetz et al. |
| 5,774,695 A | 6/1998 | Autrey et al. |
| 5,781,534 A | 7/1998 | Perlman et al. |
| 5,787,255 A | 7/1998 | Parlan et al. |
| 5,793,771 A | 8/1998 | Darland et al. |
| 5,802,285 A | 9/1998 | Hirviniemi |
| 5,805,587 A | 9/1998 | Norris et al. |
| 5,812,781 A | 9/1998 | Fahlman et al. |
| 5,815,669 A | 9/1998 | Lee et al. |
| 5,828,844 A | 10/1998 | Civanlar et al. |
| 5,852,660 A | 12/1998 | Lindquist et al. |
| 5,867,495 A | 2/1999 | Elliott et al. |
| 5,870,565 A | 2/1999 | Glitho |
| 5,872,782 A | 2/1999 | Dendi |
| 5,878,129 A | 3/1999 | Figurski et al. |
| 5,889,954 A | 3/1999 | Gessel et al. |
| 5,892,822 A | 4/1999 | Gottlieb et al. |
| 5,912,887 A | 6/1999 | Sehgal |
| 5,917,900 A | 6/1999 | Allison et al. |
| 5,920,562 A | 7/1999 | Christie et al. |
| 5,923,659 A | 7/1999 | Curry et al. |
| 5,926,482 A | 7/1999 | Christie et al. |
| 5,940,598 A | 8/1999 | Strauss et al. |
| 5,949,871 A | 9/1999 | Kabay et al. |
| 5,958,016 A | 9/1999 | Chang et al. |
| 5,974,052 A | 10/1999 | Johnson et al. |
| 5,991,301 A | 11/1999 | Christie |
| 5,995,608 A | 11/1999 | Detampel, Jr. et al. |
| 6,006,098 A | 12/1999 | Rathnasabapathy et al. |
| 6,011,780 A | 1/2000 | Vaman et al. |
| 6,011,794 A | 1/2000 | Mordowitz et al. |
| 6,011,803 A | 1/2000 | Bicknell et al. |
| 6,014,379 A | 1/2000 | White et al. |
| 6,018,515 A | 1/2000 | Sorber |
| 6,021,126 A | 2/2000 | White et al. |
| 6,023,502 A | 2/2000 | Bouanaka et al. |
| 6,026,091 A | 2/2000 | Christie et al. |
| 6,047,005 A | 4/2000 | Sherman et al. |
| 6,064,653 A | 5/2000 | Farris |
| 6,067,546 A | 5/2000 | Lund |
| 6,069,890 A | 5/2000 | White et al. |
| 6,075,783 A | 6/2000 | Voit |
| 6,078,582 A | 6/2000 | Curry et al. |
| 6,079,036 A | 6/2000 | Moharram |
| 6,084,892 A | 7/2000 | Benash et al. |
| 6,084,956 A | 7/2000 | Turner et al. |
| 6,094,437 A | 7/2000 | Loehndorf, Jr. et al. |
| 6,097,719 A | 8/2000 | Benash et al. |
| 6,097,805 A | 8/2000 | Figurski et al. |
| 6,111,893 A | 8/2000 | Volftsun et al. |
| 6,112,090 A | 8/2000 | Valentine |
| 6,115,383 A | 9/2000 | Bell et al. |
| 6,118,779 A | 9/2000 | Madonna |
| 6,118,780 A | 9/2000 | Dunn et al. |
| 6,119,160 A | 9/2000 | Zhang et al. |
| 6,122,255 A | 9/2000 | Bartholomew et al. |
| 6,122,263 A | 9/2000 | Dhalin et al. |
| 6,122,365 A | 9/2000 | Yegoshin |
| 6,125,111 A | 9/2000 | Snow et al. |
| 6,125,177 A | 9/2000 | Whittaker |
| H1880 H | 10/2000 | Vines et al. |
| H1896 H | 10/2000 | Hoffpauir et al. |
| 6,128,379 A | 10/2000 | Smyk |
| 6,134,235 A | 10/2000 | Goldman et al. |
| 6,134,246 A | 10/2000 | Cai et al. |
| 6,137,869 A | 10/2000 | Voit et al. |
| 6,137,874 A | 10/2000 | Brown et al. |
| 6,144,667 A | 11/2000 | Doshi et al. |
| 6,144,670 A | 11/2000 | Sponaugle et al. |
| 6,151,390 A | 11/2000 | Volftsun et al. |
| 6,154,467 A | 11/2000 | Hager et al. |
| 6,157,710 A | 12/2000 | Figurski et al. |
| 6,195,425 B1 | 2/2001 | Farris |
| 6,201,804 B1 | 3/2001 | Kikinis |
| 6,215,783 B1 | 4/2001 | Neyman |
| 6,236,722 B1 | 5/2001 | Gilbert et al. |
| 6,324,183 B1 | 11/2001 | Miller et al. |
| 6,366,655 B1 | 4/2002 | Book et al. |
| 6,411,632 B2 | 6/2002 | Lindgren et al. |
| 6,483,837 B1 * | 11/2002 | Howell et al. ........... 370/395.3 |
| 6,483,842 B1 | 11/2002 | Mauger |
| 6,496,512 B1 * | 12/2002 | Medhat ..................... 370/410 |
| 6,507,649 B1 | 1/2003 | Tovander |
| 6,584,190 B1 | 6/2003 | Bressler |
| 6,594,258 B1 | 7/2003 | Larson et al. |
| 6,631,133 B1 * | 10/2003 | Christie et al. .......... 370/395.3 |
| 6,636,504 B1 | 10/2003 | Albers et al. |
| 6,668,051 B1 | 12/2003 | Ashdown et al. |
| 6,674,748 B1 | 1/2004 | Dykhuizen et al. |
| 6,678,242 B1 | 1/2004 | Simon |
| 2001/0046234 A1 | 11/2001 | Agrawal et al. |
| 2002/0150221 A1 | 10/2002 | Carson et al. |

FOREIGN PATENT DOCUMENTS

| | | |
|---|---|---|
| WO | WO 97/11563 | 3/1997 |
| WO | WO 98/28885 | 7/1998 |
| WO | WO 00/19758 | 4/2000 |
| WO | WO 00/22840 | 4/2000 |
| WO | WO 00/30369 | 5/2000 |
| WO | WO 00/31933 | 6/2000 |
| WO | WO 00/33519 | 6/2000 |
| WO | WO00/35155 | 6/2000 |
| WO | WO 00/56032 | 9/2000 |

OTHER PUBLICATIONS

Stewart et al., "Stream Control Transmission Protocol," Internet draft, Network Working Group, p. 1-107, (Jun. 1, 2000).

Lakshmi-Ratan, "The Lucent Technologies Softswitch-Realizing the Promise of Convergence," Bell Labs Techincal Journal, p. 174-195, (Apr.-Jun. 1999).

Hamdi et al, "Voice Service Interworking for PSTN and IP Networks," IEEE Communications Magaine, p. 104-111, (May 8, 1999).

Zaharychuk et al., "ICC/SUPERCOM '90," IEEE, p. 223.2.1-223.2.8, (1990).

O'Shea, "Mating Season," Telephony, p. 10-11, (Sep. 20, 1999).

Tekelec, "Eagle (Registered) Feature Guide," PN/9110-1225-01, (Jan., 1998).

Tekelec, "Eagle (Registered) STP Platform," 908-0126-01, (1997).

Tekelec, "STP Lan Interface Feature," 908-0134-01, (1997).

Tekelec, "STP Database Transport Access Feature," 908-0136-01, (1997).

Tekelec, "STP X.25 to SS7-IS.41 Protocol Conversion Feature," 908-0135-01, (1997).

Tekelec, "STP ANSI-ITU Gateway Feature," 908-0133-01, (1997).

Tekelec, "SS7-Frame Relay Access Device SS7 Protocol Information Translator," 908-0167-01, (1997).

O'Shea, "The Network That's Never Done," Telephony, p. 38, 40, 42, and 43, (Sep. 15, 1997).

Snyder, "Rerouting Internet Traffic Jams," Telephony, p. 12, (Nov. 11, 1996).

Snyder, "Branded With Optics," Telephony, p. 49-50, (Jul. 22, 1996).

Anonymous, "Around the Loop," Telephony, p. 26, (Jul. 22, 1996).

Bootman et al., "Generic Building Blocks for the Telecommunications Management Network," IEEE, p. 6.1.1-6.1.5, (1988).

Bootman, "Intelligent Network Services Using a Service Switching Node," IEEE, p. 40.7.1-40.7.4, (1988).

Buckles, "Very High Capacity Signaling Transfer Point For Intelligent Network Services," IEEE, p. 40.2.1-40.2.4, (1988).

Michael McGrew, "Transprt SS7 Signaling Over IP," Lucent Technologies Inc., p. 1-8, (Nov. 1998).

Pai, "In-Building Wireless: The Next Generation," TelephonyOnline.com, pp. 1-4 (Jun. 30, 2004).

Handa, "In Building Wireless: The Next Generation," TMCnet.com, pp. 1-7 (Feb. 12, 2004).

Fitchard, "A New Voice in the Boardroom," Wireless Review, pp. 1-3 (Sep. 1, 2003).

"Fixed Wireless Technology," ISP Planet, pp. 1-4 (May 14, 2002).

Martinek, "Office on the Fly," Wireless Review, pp. 1-4 (Jul. 15, 2001).

"March Networks 3300 Integrated Communications Platform," Mitel Networks Corporation, pp. 1-34 (Jul. 2001).

Swartz, "Ready, Set, Wireless Office!," Wireless Review, pp. 1-4 (Jun. 1, 2000).

"Telstra and Ericsson Trial Next Generation Wireless Office Solution," Ericsson, pp. 1-2 (Apr. 28, 2000).

"Mitel and Ericsson Join Forces to Deliver an Integrated Digital Wireless Office Solution with PBX Functionality-Company Business and Marketing," Cambridge Telecom Report, pp. 1-4 (Apr. 24, 2000).

"Market and Development Agreement Targets Customers Looking for Ways to Become More Productive Through Convenient and Cost-Effective Communication," Ericsson Press Release, pp. 1-2 (Apr. 4, 2000).

Sulkin, "Emerging Options for Wireless PBXs," Voice2000, pp. 1-8 (Feb. 2000).

Drzewianowski, "WLANs—For the Picking," Communications Solutions™ Next-Gen Networks, pp. 1-9 (Jan. 2000).

"The Wireless Business Connection," Second Quarter 2000 Report, The Phillips Group—Infotech, pp. 1-9 (2000).

"Ericsson Announces General Availability of Its Mobile Advantage Wireless Office System," Ericsson Press Release, pp. 1-2 (Nov. 4, 1999).

"Corporate Offices to Go Wireless First Australian GSM on the Net Trial," Ericsson Press Release, pp. 1-3 (Aug. 11, 1999).

"Ericsson Solution Chosen for World's First Combined DECT/GSM Communications Service," Ericsson, pp. 1-9 (Jun. 21, 1999).

"Enterprise IP Gateway," Ericsson, pp. 1-6 (1999).

"The Ericsson IPT System," Ericsson, pp. 1-8 (1999).

Johanson et al., "Mobile Advantage Wireless Office—A Digital Wireless Office System for TDMA/136 Networks," Ericsson Review No. 1, pp. 20-27 (1999).

"Wireless: Top Ericsson Executives Lay Out Corporate Vision, Unveil Strategy for the Enterprise Customer—Company Business and Marketing," EDGE, On & About AT&T, pp. 1-5 (Nov. 30, 1998).

"Ericsson Wireless Office Services to Provide Digital System Through AT&T Wireless Servives," Ericsson Press Release, pp. 1-2 (Apr. 17, 1998).

Woods, "Fresno Bee Still Buzzing About Wireless," TechNews, pp. 1-2 (1995).

"teleSys Announces the Compatibility of Ericsson's Mobile Advantage Wireless Office and teleSys' MACH7-IP Gateway," teleSys Software—Press Release, pp. 1-2 (Publication Date Unknown).

* cited by examiner

| MRD DATABASE ||||||||||
| SS7 KEYS ||| DATA FIELDS |||||||
| KEY 1 || KEY 2 | SIGNALING PROTOCOL | PC/IP Add. | SSN/ PORT | ACCT. | OUTBOUND MLIM | OUTBOUND SOCKET/PORT |
| DPC | SSN | CdPA | | | | | | |
| 2-1-1 | 50 | * | SS7 | 2-1-1 | 50 | NO | 2201 | 5 |
| 1-1-1 | * | * | NCCP | 102.20.20.10 | 22 | YES | 2201 | 1 |
| * | * | 9194605555 | SIP | 102.20.20.12 | 20 | YES | 2201 | 2 |
| 2-1-1 | 78 | * | NCCP | 104.20.10.10 | 30 | NO | 2102 | 8 |
| 2-1-2 | * | * | H.323 | uswest.cnaml | * | YES | 4101 | 1 |
| 3-1-1 | * | * | SS7 | 103.23.23.10 | 45 | YES | 3306 | 6 |

| MRD DATABASE | | | | | | | | |
|---|---|---|---|---|---|---|---|---|
| IP KEYS | | KEY 4 | DATA FIELDS | | | | | |
| KEY 3 | | | | | | | | |
| HOST | PORT | CdPA | SIGNALING PROTOCOL | PC/IP Add. | SSN/ PORT | ACCT. | OUTBOUND MLIM | OUTBOUND SOCKET/PORT |
| 101.10.10.25 | 23 | * | SS7 | 2-1-1 | 50 | NO | 4201 | 12 |
| 101.10.10.35 | 34 | * | SS7 | 2-1-1 | 50 | NO | 4101 | 3 |
| * | | jsmith@aol.com | SS7 | 2-1-1 | 20 | YES | 4301 | 16 |
| 102.20.20.10 | 25 | * | SIP | 101.50.50.10 | 45 | YES | 4101 | 6 |
| 102.20.20.10 | 23 | * | H.323 | 102-20-20-10 | 23 | YES | 3108 | 15 |
| 103.30.30.10 | 24 | * | NCCP | 103.30.30.10 | 24 | NO | 3402 | 13 |
| | | Retailer.com | SIP | 104.40.50.10 | 34 | YES | 3301 | 18 |

| KEYS | | DATA FIELDS | | | | | |
|---|---|---|---|---|---|---|---|
| | | | | | | ORIGINATING | |
| CALL ID | TIME | SERVICE PROVIDER | SERVICE RECIPIENT | SERVICE TYPE | CdPA | PC/IP Add. | SSN/PORT |
| 1025 | 23:12.23 | 12 | 34 | 01 | jsmith@aol.com | 2-1-1 | 50 |
| 1534 | 23:34.01 | 23 | 13 | 01 | 9194605500 | 102.20.20.10 | 23 |
| 1632 | 23:36.59 | 12 | 15 | 03 | Retailer.com | 103.30.30.10 | 24 |

USAGE & MEASUREMENTS DATABASE — 410

*Figure 8*

METHODS AND SYSTEMS FOR PROVIDING MESSAGE TRANSLATION, ACCOUNTING AND ROUTING SERVICE IN A MULTI-PROTOCOL COMMUNICATIONS NETWORK ENVIRONMENT

TECHNICAL FIELD

The present invention relates to the routing of signaling messages in a multi-protocol communications networking environment, and more particularly to methods and systems for providing message accounting services at an internetwork routing node that is also capable of receiving, translating, and routing signaling messages that utilize a variety of communication protocols.

BACKGROUND ART

Shown in FIG. 1 is a simplified communications network scenario that includes both a Signaling System 7 (SS7) and a Transmission Control Protocol/Internet Protocol (TCP/IP) communications network, generally indicated by the numeral 100. Network 100 includes both a conventional voice type calling party 102 and a computer terminal based data type calling party 104. Both calling parties are communicatively coupled to an originating End Office (EO) or Service Switching Point (SSP) 106. With particular regard to signaling type communications, SSP 106 is generally connected via an SS7 network 108 to an SS7 signaling message routing node, Signal Transfer Point (STP) 110. Coupled to STP 110 is an SS7 message accounting and billing system 114 which is used to track SS7 signaling query messages that are destined for an SS7 database node, Service Control Point (SCP) 112. SCP node 112 might include an 800 number database, a Line Information Database (LIDB), Local Number Portability database (LNP), or other database services typically associated with the Public Switched Telephone Network (PSTN).

With particular regard to SS7 communication networks and the protocol stack typically employed therein, it will be appreciated that the overall stack can essentially be divided into two segments or layers: a lower level Message Transfer Part (MTP) layer and a higher level signaling application layer. In fact, the MTP layer, as described above, is comprised of three sub-levels that are identified as layers MTP1, MTP2 and MTP3. These three layers generally correspond to the physical, data link, and network levels as defined in the International Standards Organization (ISO) Open System Integration (OSI) protocol standard, and each layer can be configured to operate under one of many layer-specific protocols depending upon the particular network configuration scenario. For instance, the MTP1 layer protocol could be configured as DS0A, V.35, etc. Signaling application layer protocols commonly employed in an SS7 network include Transaction Capabilities Application Part (TCAP)/Signaling Connection Control Part (SCCP), ISDN User Part (ISUP), Telephone User Part (TUP), Mobile Application Part (MAP) and Broadband ISDN User Part (BISUP). With respect to the OSI model mentioned above, these SS7 signaling application protocols essentially correspond to OSI layers 4 through 7, and in some cases a portion of the OSI layer 3. Such signaling application layer protocols are concerned primarily with facilitating call setup/teardown and various call related services (e.g., toll free service, local number portability, calling name delivery, etc.). In general, it will be appreciated that the lower level MTP layers are concerned with, and responsible for, ensuring reliable transport of a signaling message between applications residing on different SS7 network nodes.

In light of the previous discussion, it will be appreciated that within an SS7 signaling network, SS7 signaling protocol messages are typically transmitted over dedicated communication links that employ an MTP transport protocol suite.

Returning to FIG. 1, it will be noted that further connected to SSP 106 is an Internet Service Provider (ISP) 116, which is also communicatively coupled to an Internet Protocol communications network 118, such as the Internet. As such, ISP 116 effectively provides a calling party that is served by SSP 106 with access to the Internet 118. Connected to and generally contained within the Internet "cloud" 118 are a large number of data packet routers, one of which is shown in FIG. 1 as router 120. Further coupled to Internet data router 120 is a database node 122 and a billing system 124. Database node 122 might include domain name information, presence or status information, or any number of database applications utilized by Internet type service providers or e-commerce type operators. In a manner similar to that described above, billing system 124 is coupled to router 120 so as to generally track messages destined for Internet database node 122.

With particular regard to IP-based communication networks and the protocol stack typically employed therein, in a manner analogous to that described above for SS7/MTP protocols, it will again be appreciated that the overall stack can essentially be divided into two components: a lower level or suite of transport related protocols and a higher level signaling application related layer. For the case of a Transmission Control Protocol (TCP)/IP based communication network, it will be appreciated that the transport protocol suite, as referred to herein, refers to OSI layers 1 through 3. Consequently, with regard to TCP/IP based communication, OSI layers 4 through 7 are referred to herein as the higher level or signaling application related layers. Again, as both the ISO OSI and the SS7/MTP protocol models are well known to those skilled in the art of packet network communications, a detailed description and discussion of the basic OSI and SS7/MTP models is not presented herein. A detailed discussion of the OSI model can be found in *Communications for Cooperating Systems OSI, SNA, and TCP/IP* by R. J. Cypser, Addison-Wesley Publishing Company, Inc., 1991. Similarly, a detailed discussion of the SS7/MTP protocol can be found in *Signaling System #7* by Travis Russell, $2^{nd}$ ed. McGraw-Hill, Inc., 1998.

Given the configuration of network 100, and the inherent incompatibility of the two communication transport protocol suites (MTP vs. TCP/IP), there is no way that an Internet protocol node can directly or indirectly access a database node in the SS7 component of the network. Similarly, there is no mechanism whereby an SS7 node can access a database node in the IP component of the network.

One solution to the above stated problem is to employ a stand-alone protocol converter node 126 that resides in front of the SS7 SCP node 112 as indicated in FIG. 2. Protocol converter node 126 is capable of receiving a TCP/IP based non-SS7 database query message (i.e., a message that employs a non-SS7 signaling application protocol such as session initiation protocol (SIP), H.323, etc.) and translating this message into an SS7/MTP formatted query message that can be processed by SCP 112. However, as indicated in FIG. 2, such a configuration makes the problem of message accounting/billing considerably more complicated, as all query messages destined for SCP 112 do not necessarily pass through STP 110. Furthermore, such a configuration requires that a network operator install and maintain separate protocol converting nodes, which generally increases network complexity and creates additional OA&M burdens.

What is needed is a system and method of providing a packet routing node that is capable of facilitating communication between networks that employ differing transport level protocols (e.g., MTP vs. TCP/IP) and differing signaling application level protocols (e.g., SS7 vs. SIP). Also needed is the ability for such a multi-protocol routing node to simultaneously provide centralized message accounting and billing capability in a multi-protocol communication network environment.

DISCLOSURE OF THE INVENTION

According to one aspect, the present invention includes a communications network element that is capable of generally receiving, processing and routing signaling messages between communication networks that employ differing signaling application protocols. Furthermore, the communications network element, referred to herein as a Multi-Protocol Gateway (MPG) routing node, is adapted to make a routing decision, perform message translation at both the transport protocol suite and signaling protocol levels as required, so as to generally facilitate signaling message transmission to a node in a non-SS7 network. It will be appreciated that herein a transport protocol suite refers to the collection of lower level stack protocols associated with the transport of signaling message packets through a communications network, such as Message Transfer Part (MTP) or Transmission Control Protocol/Internet Protocol (TCP/IP).

It will be further appreciated that herein, a signaling application protocol refers to the particular type of higher level signaling protocol used in a communications network, such as SS7, SIP, H.323, or Normalized Call Control Protocol (NCCP). The session initiation protocol is defined in SIP: Session Initiation Protocol, RFC 2453, IETF Network Working Group (March 1999), the disclosure of which is incorporated herein by reference in its entirety. H.323 is defined in ITU Recommendation H.323: Packet Based Multimedia Systems (September 1999), the disclosure of which is incorporated by reference in its entirety. The normalized call control protocol is a protocol used by an SS7/IP gateway for communicating ISUP messages of a given national format to a normalized format for delivery to IP devices and vice versa. The MPG is further configured to update an integrated message accounting and billing system based on certain predetermined message criteria. Once again, it will be appreciated that an MPG routing node is adapted to make a routing decision, perform message translation at both the transport suite and signaling application protocol levels as required, so as to generally facilitate signaling message transmission to a node in a destination network that does not necessarily employ the same signaling or transport protocol suites as the network from which the message originated. Again, the MPG is further configured to update an integrated message accounting and billing system based on certain pre-determined criteria.

In one embodiment, the MPG routing node includes a communication module or modules capable of transmitting and receiving data packets over MTP, TCP/IP, UDP/IP, and Stream Control Transmission Protocol (SCTP)/IP based networks, wherein these data packets may employ SS7, SIP, H.323, NCCP or similar signaling protocols. The SCTP protocol is a protocol for transferring SS7 messages over an IP network. SCTP is defined in Stream Control Transmission Protocol <draft-ieff-sigtran-sctp-10.txt>, IETF Network Working Group (Jun. 16, 2000), the disclosure of which is incorporated herein by reference in its entirety.

With particular regard to the transmission of SS7 information through TCP/IP type communication networks, the Assignee of the present application has previously disclosed a protocol (Transport Adapter Layer Interface, TALI) that was developed specifically for such an MTP-to-TCP/IP transmission scenario. A detailed description of the TALI protocol may be found in the *TALI 2.0 Technical Reference*, published by Tekelec, Inc. of Calabasas, Calif. (June 2000), the disclosure of which is incorporated herein by reference in its entirety. The TALI protocol is also described in detail in commonly-assigned, copending U.S. patent application Ser. No. 09/588,852, filed Jun. 6, 2000, and in Patent Cooperation Treaty Publication No. WO 00/35156, published Jun. 15, 2000, the disclosures of each of which are incorporated herein by reference in their entirety.

The functions for providing MPG routing and accounting services are described herein as modules or processes. It is understood that these modules or processes may be implemented as computer-executable instructions embodied in a computer-readable medium. Alternatively, the modules or processes described herein may be implemented entirely in hardware. In yet another alternative embodiment, the modules or processes described herein may be implemented as a combination of hardware and software.

The processes and modules for providing MPG routing and accounting services are described below as being associated with cards or subsystems within a routing node. It is understood that these cards or subsystems include hardware for storing and executing the processes and modules. For example, each card or subsystems described below may include one or more microprocessors, such as an x86 or Pentium® microprocessor available from Intel Corporation, and associated memory.

Accordingly, it is an object of the present invention to provide a routing node that facilitates the routing and accounting of messages between a plurality of network elements that do not share a common signaling application protocol.

It is another object of the present invention to provide a routing node that facilitates the accounting and routing of messages between a plurality of network elements that do not share a common transport protocol suite.

It is another object of the present invention to provide a routing node that facilitates the pre-routing translation of a received signaling message employing a first signaling protocol into a second signaling message that employs a Normalized Call Control Protocol (NCCP).

It is another object of the present invention to provide a multi-protocol routing and accounting node that is capable of determining the destination and corresponding routing address of a signaling message based, at least in part, on a particular service requested by the incoming message.

It is another object of the present invention to provide a multi-protocol routing and accounting node that is capable of determining the destination and corresponding routing address of a signaling message based, at least in part, on the message type of the incoming message.

It is another object of the present invention to provide a multi-protocol routing and accounting node that is capable of determining the destination and corresponding routing address of a signaling message based, at least in part, on an intermediate destination address specified in the message.

It is another object of the present invention to provide a multi-protocol routing and accounting node that is capable of determining the destination and corresponding routing address of a signaling message based, at least in part, on an origination or sending address specified in the message.

It is another object of the present invention to provide a multi-protocol routing and accounting node that is capable of determining the destination and corresponding routing address of a signaling message based, at least in part, on calling or called party information specified in the message.

It is another object of the present invention to provide a multi-protocol routing and accounting node that is capable of determining the destination and corresponding routing address of a signaling message based, at least in part, on ownership of a destination network node.

It is another object of the present invention to provide a multi-protocol routing and accounting node that is capable of determining the destination and corresponding routing address of a signaling message based, at least in part, on ownership of a network node that originated the message.

It is another object of the present invention to provide a routing and accounting node that is capable of receiving signaling messages having different transport protocol suites and signaling application protocols, wherein all messages are addressed to the routing and accounting node, and wherein the routing and accounting node further determines where to route the message and subsequently translates the message into the proper transport protocol suite and signaling protocol necessary for delivery to the destination.

Some of the objects of the invention having been stated hereinabove, other objects will become evident as the description proceeds, when taken in connection with the accompanying drawings as best described hereinbelow.

BRIEF DESCRIPTION OF THE DRAWINGS

Embodiments of the present invention will now be explained with reference to the accompanying drawings, of which:

FIG. 6a is a table that illustrates a Multi-protocol Routing Database (MRD) which includes a Signaling System 7 (SS7) key structure;

FIG. 6b is a table that illustrates a Multi-protocol Routing Database (MRD) which includes an Internet Protocol (IP) key structure;

FIG. 8 is a table that illustrates a sample Usage and Measurements Database (UMD) structure and data.

DETAILED DESCRIPTION OF THE INVENTION

Figure 1:
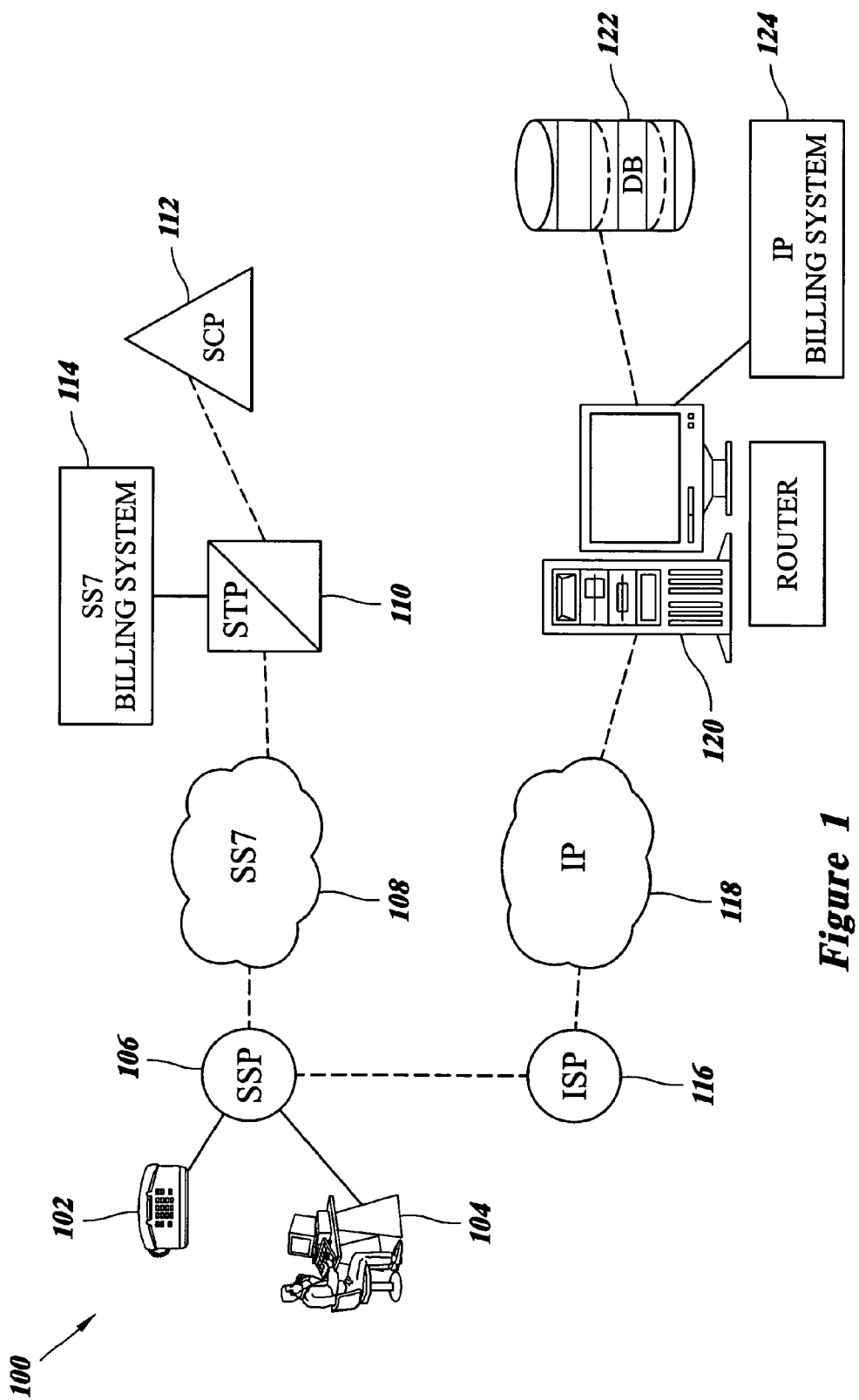
FIG. 1 is a network diagram illustrating a prior art network architecture that employs a first distributed, network specific billing solution.
Figure 2:
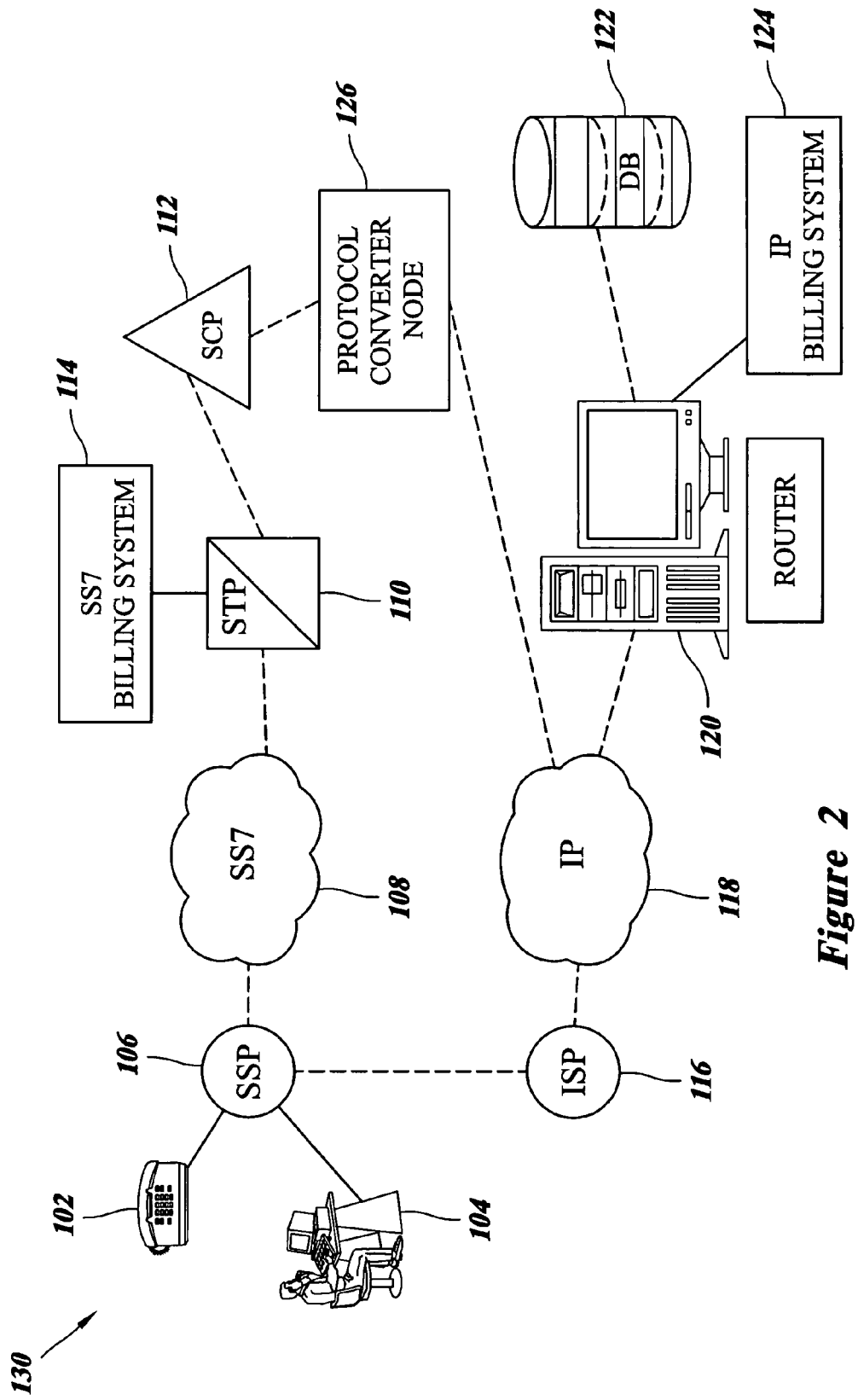
FIG. 2 is a network diagram illustrating a prior art network architecture that employs a second distributed, network specific billing solution.
Figure 3:
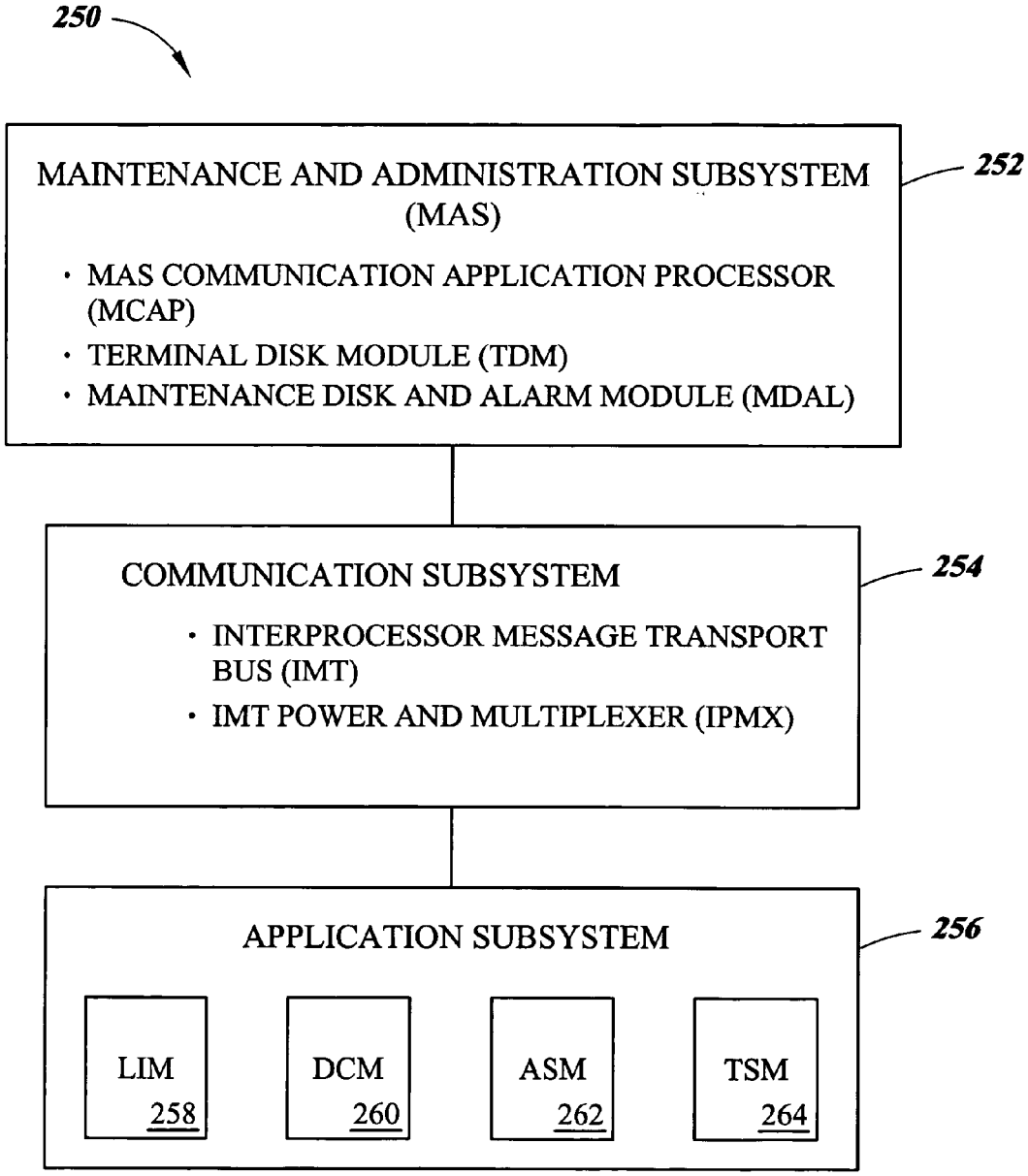
FIG. 3 is a schematic diagram of an STP switching node.

Disclosed herein are several embodiments of the present invention, all of which include a network element that performs functions similar to that of a traditional telecommunications network packet routing switch, such as a Signal Transfer Point (STP). Each of the embodiments described and discussed below, employs an internal architecture similar to that of high performance STP and signaling gateway (SG) products which are marketed by the assignee of the present application as the Eagle®STP and IP$^7$ Secure Gateway™, respectively. A block diagram that generally illustrates the base internal architecture of the IP$^7$ Secure Gateway™ product is shown in FIG. 3. A detailed description of the Eagle® STP may be found in the *Eagle® Feature Guide* PN/910-1225-01, Rev. B, January 1998, published by Tekelec, Inc. of Calabasas, Calif., the disclosure of which is hereby incorporated herein by reference. Similarly, a detailed description of the IP$^7$ Secure Gateway™ may be found in Tekelec publication PN/909-0767-01, Rev B, August 1999, titled *Feature Notice IP$^7$ Secure Gateway™ Release 1.0*, the disclosure of which is hereby incorporated by reference. The specific functional components of an IP$^7$ Secure Gateway™ for transmitting and receiving Transaction Capabilities Application Part (TCAP) messages over an Internet Protocol (IP) network are described in PCT Publication No. WO 00/35155, published Jun. 15, 2000, the disclosure of which is incorporated herein by reference in its entirety. Similarly, the specific functional components of an IP$^7$ Secure Gateway™ for transmitting and receiving ISDN User Part (ISUP) messages over an Internet Protocol (IP) network are described in the above-referenced PCT Publication No. WO 00/35156.

As described in the above referenced *Eagle® Feature Guide*, an Eagle® STP 250 includes the following subsystems: a Maintenance and Administration Subsystem (MAS) 252, a communication subsystem 254 and an application subsystem 256. The MAS 252 provides maintenance communications, initial program load, peripheral services, alarm processing and system disks. The communication subsystem 254 includes an Interprocessor Message Transport (IMT) bus that is the main communication bus among all subsystems in the Eagle® STP 250. This high-speed communications system functions as two 125 Mbps counter-rotating serial buses.

The application subsystem 256 includes application cards that are capable of communicating with the other cards through the IMT buses. Numerous types of application cards can be incorporated into STP 250, including but not limited to: a Link Interface Module (LIM) 258 that provides SS7 links and X.25 links, a Data Communication Module (DCM) 260 that provides an Internet Protocol (IP) interface using Transmission Control Protocol (TCP), and an Application Service Module (ASM) 262 that provides global title translation, gateway screening and other services. A Translation Service Module (TSM) 264 may also be provided to support local number portability service. While multiple application modules or cards may be simultaneously configured and operatively connected to the IMT bus, it will be appreciated that each card is assigned a unique IMT bus address so as to generally facilitate the internal communication of messages between provisioned application cards that are attached to the bus. Once again, a detailed description of the Eagle® STP other than DCM 260 is provided in the above-cited *Eagle® Feature Guide* and need not be described in detail herein. DCM 260 is described in detail in one or more of the above-referenced PCT publications.

With particular regard to communication type modules, it should also be appreciated that in a manner similar to conventional SS7 LIM cards, the above mentioned DCM card can be employed to provide for the transport of Internet Protocol (IP) encapsulated SS7 messages over an IP network, as described in the above referenced *Feature Notice IP⁷ Secure Gateway™ Release* 1.0 publication. With regard to the TSM module and triggered LNP services mentioned above, a detailed description of the Tekelec triggered LNP solution may be found in the *Feature Guide LNP LSMS* PN/910-1598-01, Rev. A, January 1998, published by Tekelec, Inc. of Calabasas, Calif., the disclosure of which is hereby incorporated herein by reference. Furthermore, systems and methods for providing triggerless LNP functionality within a network routing node are described in commonly-assigned, co-pending U.S. patent application Ser. No. 09/503,541, filed Feb. 14, 2000, the disclosure of which is incorporated herein by reference in its entirety.

Figure 4:
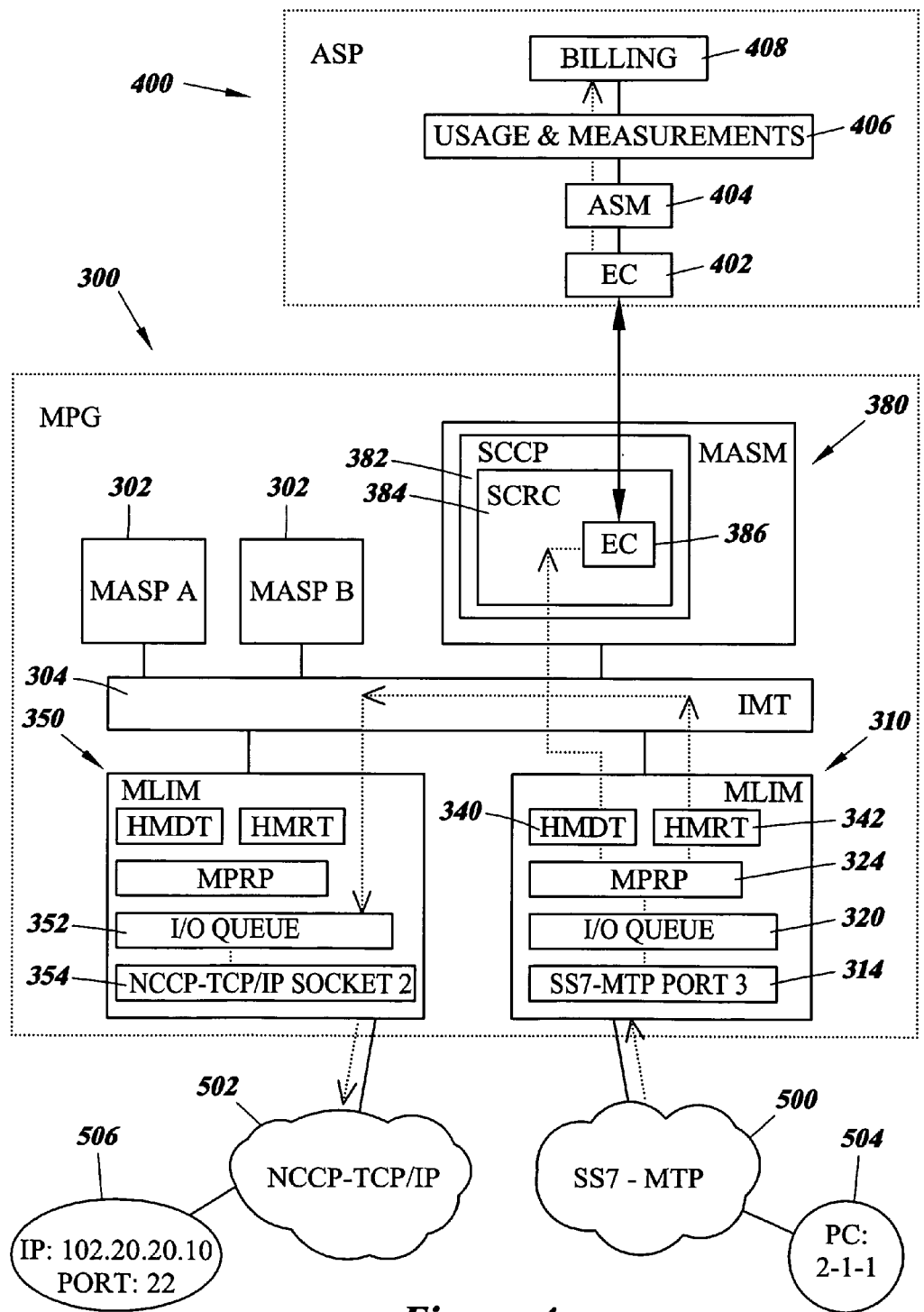
FIG. 4 is a schematic diagram that illustrates an embodiment of a Multi-protocol Gateway (MPG) routing and accounting node of the present invention.

Shown in FIG. 4 is one embodiment of a Multi-Protocol Gateway (MPG) packet routing switch of the present invention, generally indicated by the numeral 300. MPG 300 is adapted to route message packets between two dissimilar communication networks, and to further provide message accounting and billing services associated with such inter-network routing. As discussed briefly above, MPG routing and accounting node 300 employs an internal architecture that is similar in design and operation to that of an Eagle® STP and an IP⁷ Secure Gateway™. As such, MPG node 300 generally includes an Interprocessor Message Transport (IMT) bus 304 that is the main communication bus among all subsystems in the node. MPG node further includes a Maintenance and Administration Subsystem (MAS) 302. Again, MAS 302 provides maintenance communications, initial program load, peripheral services, alarm processing and system disks.

The MPG shown in FIG. 4 also includes a pair of MLIM cards, 310 and 350, and an integrated message accounting and billing subsystem. In the particular embodiment shown, the message accounting and billing subsystem is comprised of a Multi-protocol Accounting Service Module (MASM) 380 and an external Accounting Server Platform (ASP) 400. From a practical implementation standpoint, ASP 400 could assume the form of a Sun Workstation or similar type computing platform. It will be further appreciated that the entire message accounting and billing subsystem could also be integrated within the MPG switch, such that no significant external computing platform is required.

It will also be appreciated that the MLIM and MASM cards 310, 350, and 380, respectively, are connected via the shared, internal high speed IMT communications bus 304, and that multiple application cards (e.g., MLIMs, LIMs, DCMs, TSMs, ASMs, etc.) can be simultaneously configured and operatively connected to the IMT bus.

Multi-Protocol Link Interface Module (MLIM)

Figure 5:
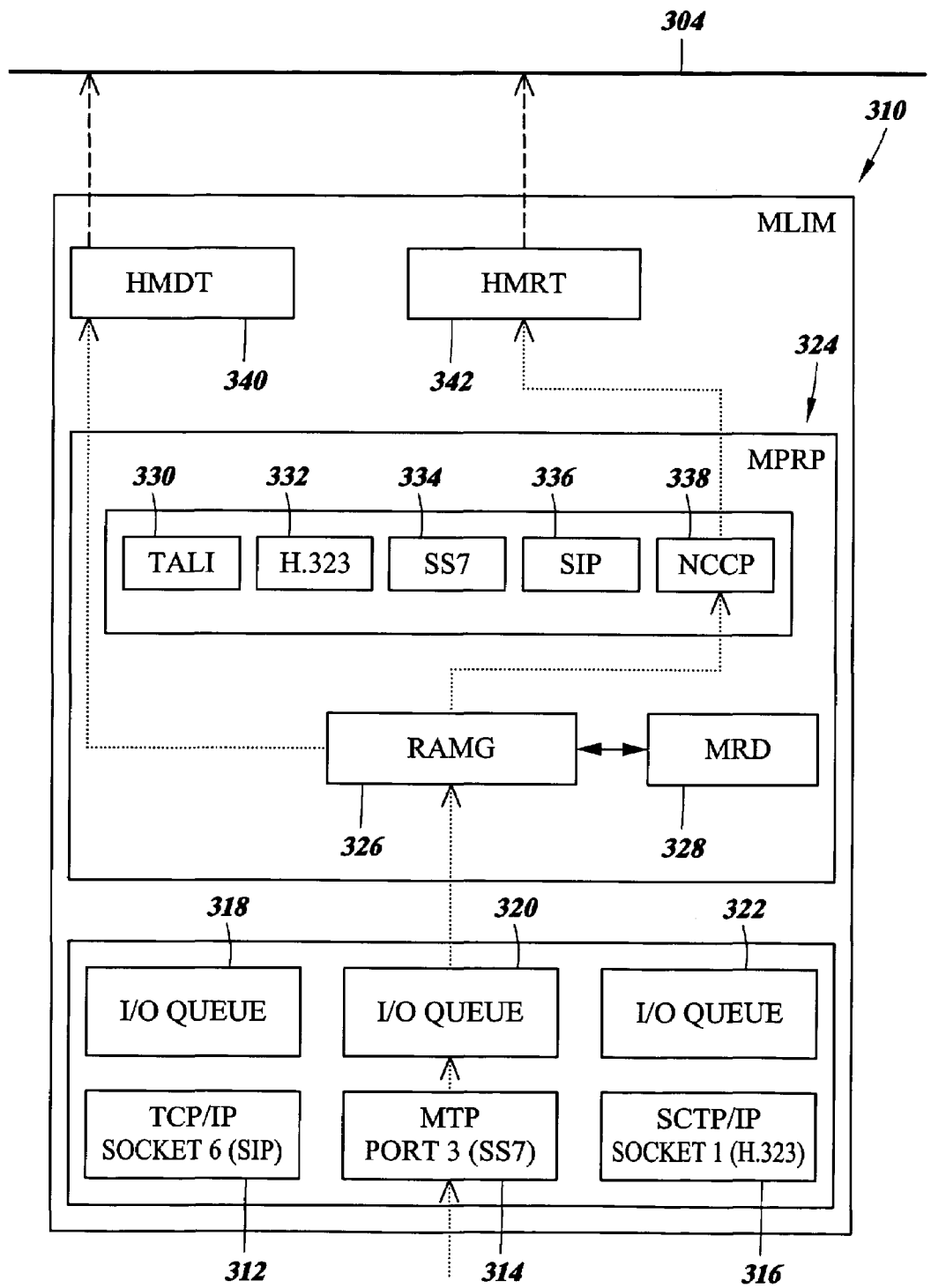
FIG. 5 is a schematic diagram that illustrates a Multi-protocol Link Interface Module (MLIM) card and a processing flow path associated with an inbound signaling message.

Shown in FIG. 5 is one embodiment of a Multi-protocol Link Interface Module (MLIM) card 310 that is configured to transmit, receive, and generally facilitate communication between two communication networks that employ dissimilar signaling and transport protocol suites. MLIM 310 is somewhat similar in function and form to a conventional LIM, as described in the above referenced Tekelec Eagle and IP⁷ Secure Gateway product and design publications. The MLIM, described herein, expands on the conventional LIM concept so as to provide the additional capability to communicate signaling information between dissimilar networks that utilize a variety of non-SS7 based signaling protocols and non-MTP based transport protocol suites.

In general an MLIM card may be configured to include one or more transport protocol suite processes. In the example illustrated in FIG. 5, MLIM card 310 is provisioned to support three transport protocol suite processes: a TCP/IP process 312, an MTP process 314, and an SCTP/IP process 316. Associated with each of the transport protocol suite processes 312, 314, and 316 is an input/output (I/O) queue 318, 320, and 322, respectively. It will be appreciated that these lower level protocol process can be configured via hardware, software or firmware to support the physical, data link, network, and transport layers of a variety of transport protocol suites such as MTP, TCP/IP, SCTP/IP, UDP/IP and others. As discussed previously, these lower level transport protocol suite processes are responsible for implementing the functions and services generally associated with OSI levels 1 through 4.

MLIM 310 further includes a Multi-Protocol Routing Process (MPRP) 324, which is comprised of a Routing and Accounting Manager (RAMG) process 326, a Multi-protocol Routing Database (MRD) process 328, and a plurality of signaling protocol specific translation processes. More specifically, in the particular example shown in FIG. 5, MLIM 310 is provisioned to include a TALI signaling protocol translation process 330, an H.323 signaling protocol translation process 332, an SS7 signaling protocol translation process 334, a SIP signaling protocol translation process 336, and an NCCP signaling protocol translation process 338. It will be appreciated that each of these signaling protocol translation processes is adapted to receive an incoming signaling message that is formatted in a first signaling protocol and subsequently translate the contents of this message into a second signaling protocol. For instance, in the specific example illustrated in FIG. 5, an SS7 signaling protocol message is received at MLIM 310 and subsequently delivered to NCCP signaling protocol translation process 338, where the SS7 formatted message content is parsed and translated into an NCCP formatted signaling protocol message. As discussed above, an NCCP formatted signaling message is a normalized ISUP signaling message used by IP nodes in an IP network.

A discussion of the specific messages translated by protocol translation processes 330, 332, 334, 336, and 338 is beyond the scope of this disclosure. What is important for purposes of the present invention is that lower layer and upper layer multiprotocol translation functionality, as well as accounting functionality, be located in the same network element or in one or more devices closely-coupled to the same network element. Providing the functions in the same network element greatly facilitates multiprotocol message routing and accounting, as will be discussed in more detail below.

In addition, the present invention is not intended to be limited to the protocol translation processes illustrated in FIG. 5. For example, other protocol translation processes, such as M3UA, SUA, M2UA, M2PEER, IUA, MAP and WAP may be substituted for or included in addition to the processes illustrated in FIG. 5 without departing from the scope of the invention.

MLIM 310 also includes an HMDT process 340 that is responsible for the internal distribution of messages that require processing by other subsystems (e.g., accounting and billing, local number portability, calling name delivery, etc.) in the MPG node, and an HMRT process 342 that is responsible for the internal distribution of messages that are being routed or through switched from one MLIM card to another.

With particular regard to the Routing and Accounting Manager (RAMG) process 326, it will be appreciated that RAMG process is adapted to receive incoming signaling messages and determine; (1) whether routing address translation is required, (2) whether transport suite protocol translation is required, (3) whether signaling application protocol translation is required, and (4) whether accounting of the message is required. If message accounting is required, RAMG process 326 is configured so as to produce a new message that is subsequently delivered to an associated accounting & billing subsystem. With particular regard to determining the need for transport suite protocol translation, it will be appreciated that such a need may be indirectly implied with the selection of an outbound communication link, port or socket.

In any event, the above-mentioned four determinations are made with the assistance of an associated Multi-protocol Routing Database (MRD) process 328. As generally indicated in FIGS. 5a and 5b, MRD process 328 may be comprised of multiple database table structures depending upon the particular MLIM configuration employed. More particularly, FIG. 6a illustrates a sample MRD database structure 600 that might be associated with an MLIM card that is configured to communicate with an SS7 network. FIG. 6b illustrates a sample MRD database structure 602 that might be associated with an MLIM card that is configured to communicate with an IP network.

As such, it will be appreciated that if MLIM 310 configured with the MRD database 600 shown in FIG. 6a receives an SS7 message destined for a node with an SS7 network address PC: 2-1-1 and SSN: 50, a lookup in the MRD database 600 would subsequently inform the RAMG process 326 that: (1) the appropriate destination address is PC: 2-1-1, SSN: 50 (i.e., no routing address change is necessary); (2) the appropriate destination address requires an SS7 formatted message (i.e., no transport suite or signaling protocol translation is necessary); and (3) the accounting subsystem should not be notified (i.e., no accounting of this message is necessary). Consequently, in this example scenario, the received SS7 signaling message would simply be routed or through switched.

However, it will be appreciated that if MLIM 310 configured with the MRD database 602 shown in FIG. 6a receives an SS7 message destined for an SS7 network address PC: 1-1-1, a lookup in the MRD database 602 would inform the RAMG process 326 that: (1) the appropriate destination address is an IP socket comprised of an IP address, 102.20.20.10, and an IP port 22; (2) the appropriate destination address requires an NCCP formatted message; and (3) the accounting subsystem should be notified. Consequently, the received SS7 signaling message would be passed from the RAMG process 326 to the NCCP signaling protocol translation process 338.

NCCP translation process 338 would subsequently examine the information content of the original SS7 message and generate an equivalent NCCP-formatted message, as per a pre-determined set of SS7-to-NCCP inter-protocol message type conversion rules. Such inter-protocol message type conversion rules might include, for example, instructions or rules for creating the NCCP equivalent of an ANSI ISUP IAM message. Furthermore, such conversion rules could include instructions for creating the NCCP equivalent of an 800 number, local number portability (LNP), or calling name (CNAM) SS7 TCAP query message.

Figure 7:
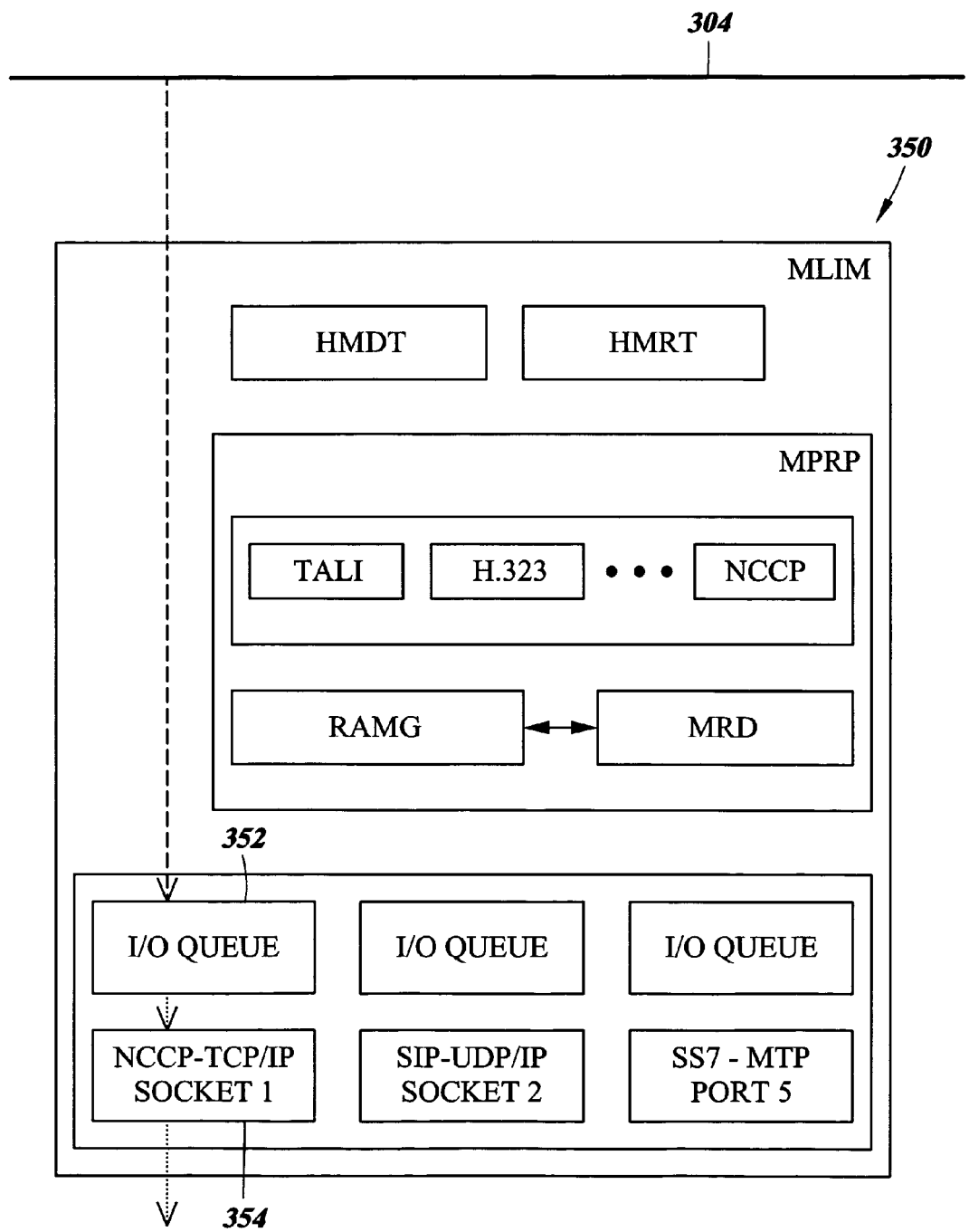
FIG. 7 is a schematic diagram that illustrates a Multi-protocol Link Interface Module (MLIM) card and a processing flow path associated with an outbound signaling message.

It will be appreciated from FIGS. 4, 5, and 6a, that once processing is completed NCCP translation process 338 passes the translated message on to HMRT process 342 for internal routing to the appropriate outbound IP-configured MLIM card that maintains TCP or UDP socket 1, with a corresponding IP address: 102.20.20.10, port 22. In the particular example present herein, TCP or UDP socket 1 has been established and is maintained on MLIM 350, and MLIM 350 has been assigned an IMT bus address identifier of 2201. As such the NCCP formatted message is internally routed to the outbound MLIM 350 and transport level protocol suite translation is effectively performed by the NCCP-TCP/IP socket process 354, as indicated in FIG. 7. In general, the outbound socket process is adapted to provide and apply the proper lower level transport protocol suite to the outbound signaling message so as to effectively prepare the outbound signaling message for transmission through the destination network.

It will be further appreciated that an incoming message could be translated or converted based on a domain name (DN) or an email address type identifier, as generally indicated in database table 602 (FIG. 6b). As mentioned previously, it is also possible to translate from any one of the industry standard signaling protocols (e.g., SS7, SIP, H.323, etc.) to a normalized signaling protocol. Such a normalized protocol could be any protocol adapted to facilitate efficient translation of signaling information and to further provide a universal signaling protocol that can be easily utilized by nodes that are required to provide service to a variety of signaling networks.

With particular regard to the message accounting and billing functionality of the MPG routing node 300, it will be appreciated that in one embodiment of the present invention, RAMG process 326 formulates an accounting message, related to a received signaling message, and passes this accounting message on to the HMDT process 340 for subsequent delivery to and processing by the MASM module 380, as generally indicated in FIG. 4. It will be appreciated that the accounting message could simply be a copy of the original received signaling message, or the accounting message could be of a message type associated specifically with the accounting subsystem. In a preferred embodiment, a normalized accounting message (NAM) format is employed that is analogous to the NCCP signaling protocol concept. That is, a NAM formatted accounting message employs a field or record structure that is essentially a superset of all parameters of interest from all signaling protocols of interest. As such, parameters of interest in a SIP formatted signaling message can be easily accommodated in a NAM accounting message, as can parameters of interest in an SS7 formatted signaling message. It will be appreciated that, in one embodiment, a NAM accounting message can be encapsulated within an SCCP packet prior to internal routing within the MPG node. Such SCCP encapsulation can be performed by a RAMG process. It will be further appreciated that the NAM format can be periodically expanded (or revised) to accommodate new or evolving signaling protocols that must be supported by an MPG node. In any event, the accounting subsystem is notified of the receipt of the incoming message.

Message Accounting Subsystem

In the embodiment illustrated in FIG. 4, MPG node 300 includes a message accounting and billing subsystem that is comprised of an internal MASM card 380, and an external ASP accounting server platform 400. It will be appreciated the combination of MASM card 380 and ASP accounting server 400 includes the database and control processes necessary to achieve the accounting and billing functionality of the present invention. Again, it should also be appreciated that the entire message accounting subsystem could also be integrated completely within the MPG node.

The MASM card 380 shown in FIG. 4 includes a Signaling Connection Control Part (SCCP) subsystem 382 that is responsible for receiving and preliminary processing of incoming SCCP encapsulated accounting message packets. MASM card 380 also includes an SCCP controller known as a Signaling Connection Routing Controller (SCRC) process 384 and a high-speed Ethernet Controller (EC) process 386. Once again, as described above, the SCCP subsystem 382 is responsible for receiving and preliminary processing of incoming SCCP encapsulated message packets, while the SCRC process 384 is responsible for discrimination and subsequent distribution of messages based on information contained in an SCCP packet. In the case of MASM card 380, messages that satisfy the SCRC discrimination criteria are distributed or directed to the high-speed Ethernet Controller process 386. EC process 386 is in turn responsible for controlling the process of communicating messages, via an Ethernet connection to and from the associated ASP server 400. More particularly, ASP server 400 includes a corresponding high-speed Ethernet Controller process 402 that serves as the communications interface between MASM card 380 and an on-board Accounting Server Manager (ASM) process 404. ASM process 404 is responsible for the de-capsulation or removal of the SCCP envelope that contains the accounting message. The de-capsulated accounting message is then passed to an adjacent Usage and Measurements process 406 where usage and measurement statistics are created and stored in a Usage and Measurements Database (UMD) 410, such as that shown in FIG. 8.

Usage and measurements statistics produced by such a process could include, but are not limited to, peg counts of messages received from a specific network address, a specific service provider, a specific service user, a specific IP socket, or a specific signaling link. As shown in sample UMD 410, each "call" or communication is identified by a call ID, and certain predetermined information associated with a "call" or communication can be stored in the database. It will be appreciated that the information contained in a UMD database could be significantly more or less detailed than that indicated in the example shown in FIG. 8.

In any event, such statistics could include information associated with the time-of-day that a message was received, the duration of a "call" or communication, general quality of service (QoS) indicators associated with a "call" or communication, information related to or identifying the type of service that is associated with a "call" or communication (i.e., broadband service related, call setup related, database query related, etc.). Such usage information could be used to bill a subscriber at different rates depending upon the type of service requested. For instance, a subscriber could be billed at one rate for a "call" or communication related to the downloading of a movie from a video server, and a different rate for a "call" associated with a real-time video-telephone conference. With such capability included within an MPG routing node, network operators greatly increased flexibility with regard to service-specific billing, without significantly increasing network OA&M requirements.

In order to facilitate such billing operations, ASP server 400 also includes a billing process 408 that is adapted to extract information stored by the Usage and Measurements process 406 and subsequently generate bills. Once again, information or parameters maintained by process 406 that may be used in the generation of bills could include, but is not limited to, a network address identifier, a service provider identifier, a service user identifier, an IP socket identifier, a signaling link identifier, and a service type identifier. It will be further appreciated that a network address identifier could include, but is not limited to a destination or origination SS7 point code, a destination or origination IP address, and a destination or origination domain name. Similarly, a user identifier could include, but is not limited to a calling or called party telephone number, and a destination or origination email address.

Furthermore, in the particular embodiment shown, copies of incoming signaling messages that require accounting service are encapsulated within an SCCP packet and subsequently internally routed to MASM 380. It should be appreciated that SCCP encapsulation is not essential to the operation of the message accounting subsystem of the present invention. Other internal encapsulating protocols could be just as easily employed, provided that a suitably provisioned MASM module is capable of receiving and processing the encapsulated messages. In fact, no encapsulation necessarily need be performed, so long as the accounting message generated by a RAMG type process can be received and generally processed by a suitable configured MASM module.

Multi-Protocol Gateway (MPG) Operation

In the example configuration shown in FIG. 4, a first MLIM 310 is configured to communicate with an SS7-MTP network 500, while a second MLIM 350 is configured to communicate with an NCCP-TCP/IP network 502. As generally indicated in FIG. 4, a first message is received by the first MLIM card 310 via an SS7-MTP Port process 314, herein identified by a Port ID of 3. It will be appreciated that MLIM card 310 has been assigned an internal IMT bus address identifier of 4101. As indicated in FIG. 4, it is assumed that the first message was sent from a node 504 residing in the SS7 network 500. Furthermore, node 504 is identified within the SS7 network by a point code (PC) value of 2-1-1, while the first message is addressed to a destination point code (DPC) value of 1-1-1. Lower level transport protocol suite processing is performed on the incoming first message by Port process 314, and the first message is subsequently passed to an associated I/O queue 320. Following buffering in the I/O queue 320, the first message is passed to the RAMG process 326. RAMG process 326 identifies the first message as having arrived via Port process 314, and directs a lookup in MRD database process 328 based on information contained in or associated with the first message.

According to the sample routing rules provided in FIG. 6a, an incoming message that is addressed to a DPC value of 1-1-1 will be subsequently routed to a network element having an IP address of 102.20.20.10, port 22. In this example, MLIM 350 has been assigned an IMT bus address of 2201, and as indicated in FIG. 6a, a connection or socket to this IP address has been established and is being maintained on the MLIM card having an IMT bus address of 2201. More specifically, a TCP/IP socket having a socket ID of 1 has been established on MLIM 350. As further indicated in FIG. 6a, the signaling protocol translation rule associated with the first message indicates the need to translate the received signaling message to an NCCP protocol prior to routing. Consequently, RAMG process 326 passes the first message to NCCP signaling protocol translation process 338 along with information returned by the MRD database lookup operation. NCCP signaling protocol translation process 338 receives the first message and performs the SS7 to NCCP translation or mapping operation, thereby effectively creating a second, functionally equivalent NCCP formatted signaling message.

As generally indicated in FIG. 5, the second NCCP formatted message is subsequently passed from the NCCP signaling protocol translation process 338 to HMRT process 342. HMRT process 342 identifies the destination MLIM card corresponding to IMT bus address 2201, and places the second signaling message on the IMT bus 304. The second message is then received by the MLIM card 350, and essentially directed to the outbound I/O queue 352 associated with the destination TCP/IP socket process 354. Socket process 354 next receives the NCCP formatted signaling message and constructs or appends the appropriate lower level transport protocol suite required to facilitate transmission to the destination node through TCP/IP based network 502. With lower level transport protocol suite processing complete, the NCCP formatted signaling message is transmitted into the TCP/IP based network 502, as generally indicated in FIG. 4.

Returning to FIG. 5, it will be appreciated that following the MRD database lookup operation described above, RAMG process 326 is adapted to generate a NAM formatted accounting message that is associated with the first signaling message. This accounting message is produced in response to the instructions returned by the MRD process 328, indicating that message accounting service is required for the first signaling message. In the embodiment of the present invention presented herein, the accounting message assumes the form of a NAM message that is essentially encapsulated within an SCCP formatted packet. This SCCP encapsulated message is subsequently directed to HMDT process 340, which in turn directs the SCCP encapsulated accounting message to MASM card 380 via IMT bus 304.

Once again, although an SCCP formatted accounting message is indicated in the particular embodiment shown in FIG. 4 and described herein, it should be appreciated that the message directed to accounting subsystem need not be of an SCCP format. Other message formats could be employed, so long as the MASM card(s) were configured to receive and process the chosen account message format.

The encapsulated accounting message is received and processed by SCCP process 382 that is resident on MASM card 380, so as to verify and generally validate the SCCP packet prior to further processing. The SCCP packet is next passed to the SCRC process 384, which is responsible for discrimination and subsequent distribution of messages based on information contained in the SCCP packet. Messages that satisfy the SCRC discrimination criteria are distributed or directed to the high-speed Ethernet Controller (EC) process 386. EC process 386 in turn communicates the SCCP message, via an Ethernet connection to the associated ASP server 400.

As such, the SCCP encapsulated accounting message is received by a corresponding EC process 402 and subsequently passed to the Accounting Services Manager (ASM) process 404. ASM process 404 examines the received accounting message, removes the SCCP encapsulating layer and extracts the information from the NAM formatted accounting message according to a pre-determined set of usage and measurement rules. This usage and measurement information is then provided to the Usage and Measurements process 406 for analysis and storage. Billing information may be generated by the accounting subsystem via the billing process 408. Billing process 408 extracts information from the Usage and Measurements process 406 and applies a set of pre-determined billing rate rules, so as to effectively generate invoices or bills indicating costs associated with various aspects of communication services.

Other accounting services might include but are not limited to usage and measurements service, fraud detection service, and network management service. Although not explicitly shown, it will be appreciated that the external accounting server includes a user interface that provides a user-friendly method of extracting and utilizing the various accounting services data once it is collected.

What is claimed is:

1. A network routing element capable of receiving, from a first communication network, a first message formatted according to a first transport protocol suite containing information that is formatted according to a first signaling protocol, and subsequently generating a second message formatted according to a second transport protocol suite containing information that is formatted in a second signaling protocol and transmitting the second message to a second communication network, the network element comprising:

a) a first communication module capable of receiving, from the first communication network, a first message formatted according to the first transport protocol suite and containing information that is formatted according to the first signaling protocol;

b) a second communication module capable of transmitting, to the second communication network, a second message formatted according to the second transport protocol suite containing information that is formatted according to the second signaling protocol;

c) a Multi-protocol Routing Database (MRD) for storing protocol translation and routing information;

d) a multi-protocol routing process for extracting information from the MRD and subsequently directing the first message to a translation process based on the information; and e) a transport protocol suite process for receiving the second message from the multi-protocol routing process based on the first message and for applying the second transport protocol suite and associated routing instructions to the second message.

2. The network routing element of claim 1 wherein the first signaling protocol is a Signaling System 7 (SS7) signaling protocol.

3. The network routing element of claim 1 wherein the first signaling protocol is a Session Initiation Protocol (SIP) signaling protocol.

4. The network routing element of claim 1 wherein the first signaling protocol is an H.323 signaling protocol.

5. The network routing element of claim 1 wherein the first signaling protocol is a Normalized Call Control Protocol (NCCP) signaling protocol.

6. The network routing element of claim 1 wherein the second signaling protocol is an SS7 signaling protocol.

7. The network routing element of claim 1 wherein the second signaling protocol is a Session Initiation Protocol (SIP) signaling protocol.

8. The network routing element of claim 1 wherein the second signaling protocol is an H.323 signaling protocol.

9. The network routing element of claim 1 wherein the second signaling protocol is a Normalized Call Control Protocol (NCCP) signaling protocol.

10. The network routing element of claim 1 wherein the first transport protocol suite includes the Message Transfer Part (MTP) of the SS7 protocol.

11. The network routing element of claim 1 wherein the first transport protocol suite includes Transmission Control Protocol/Internet Protocol (TCP/IP).

12. The network routing element of claim 1 wherein the first transport protocol suite includes Simple Control Transmission Protocol/Internet Protocol (SCTP/IP).

13. The network routing element of claim 1 wherein the second transport protocol suite includes Message Transfer Part (MTP) of the SS7 protocol.

14. The network routing element of claim 1 wherein the second transport protocol suite includes Transmission Control Protocol/Internet Protocol (TCP/IP).

15. The network routing element of claim 1 wherein the second transport protocol suite includes Simple Control Transmission Protocol/Internet Protocol (SCTP/IP).

16. The network routing element of claim 1 including a message accounting subsystem (MAS) for generating and maintaining usage measurements and billing information associated with messages that are processed and routed through the network routing element.

17. The network routing element of claim 16 wherein the MAS is located within and integral with the network routing element.

18. The network routing element of claim 16 wherein the MAS is configured as an external database platform.

19. The network routing element of claim 18 wherein the external MAS platform is connected to the network routing element via a high-speed Ethernet link.

20. The network routing element of claim 1 wherein the MRD includes message accounting subsystem (MAS) processing instructions.

21. The network routing element of claim 16 wherein the MAS is configured to receive a copy of the first signaling message.

22. The network routing element of claim 16 wherein the MAS is configured to receive a Normalized Accounting Message (NAM) message that is based on information contained in the first message.

23. The network routing element of claim 1 wherein the MRD protocol translation instructions include signaling protocol translation instructions.

24. The network routing element of claim 1 wherein the MRD is indexed by IP host and port values.

25. The network routing element of claim 1 wherein the MRD is indexed by socket values.

26. The network routing element of claim 1 wherein the MRD is indexed by Point Code (PC) values.

27. The network routing element of claim 1 wherein the MRD is indexed by Called Party Address (CdPA) values.

28. The network routing element of claim 27 wherein the CdPA value is a telephone number.

29. The network routing element of claim 27 wherein the CdPA value is an Internet Domain Name (DN).

30. The network routing element of claim 27 wherein the CdPA value is an Internet email address.

31. A method for routing signaling messages between networks with differing signaling protocols and differing transport protocol suites, the method comprising:
 a) receiving, from a first communications network that employs a first transport protocol suite, a first message formatted according to a first signaling protocol;
 b) determining where to route the first message;
 c) determining whether the first message requires a signaling protocol translation;
 d) in response to determining that the first message requires a signaling protocol translation, directing the first message to a signaling protocol translation process for translation into an equivalent second message that is formatted in a second signaling protocol;
 e) applying a second transport protocol suite to the second message; and
 f) transmitting the second message into a second communication network.

32. The method of claim 31 wherein the first signaling protocol is a Signaling System 7 (SS7) signaling protocol.

33. The method of claim 31 wherein the first signaling protocol is a Session Initiation Protocol (SIP) signaling protocol.

34. The method of claim 31 wherein the first signaling protocol is an H.323 signaling protocol.

35. The method of claim 31 wherein the first signaling protocol is a Normalized Call Control Protocol (NCCP) signaling protocol.

36. The method of claim 31 wherein the second signaling protocol is an SS7 signaling protocol.

37. The method of claim 31 wherein the second signaling protocol is a Session Initiation Protocol (SIP) signaling protocol.

38. The method of claim 31 wherein the second signaling protocol is an H.323 signaling protocol.

39. The method of claim 31 wherein the second signaling protocol is a Normalized Call Control Protocol (NCCP) signaling protocol.

40. The method of claim 31 wherein the first transport protocol suite includes the Message Transport Part (MTP) of the SS7 signaling protocol.

41. The method of claim 31 wherein the first transport protocol suite includes Transmission Control Protocol/Internet Protocol (TCP/IP).

42. The method of claim 31 wherein the first transport protocol suite includes Simple Control Transmission Protocol/Internet Protocol (SCTP/IP).

43. The method of claim 31 wherein the second transport protocol suite includes the Message Transport Part (MTP) of the SS7 protocol.

44. The method of claim 31 wherein the second transport protocol suite includes Transmission Control Protocol/Internet Protocol (TCP/IP).

45. The method of claim 31 wherein the second transport protocol suite includes Simple Control Transmission Protocol/Internet Protocol (SCTP/IP).

46. The method of claim 31 wherein determining where to route the first message includes examining routing rules that are stored in a multiprotocol routing database (MRD).

47. The method of claim 31 wherein determining whether the first message requires signaling protocol translation includes signaling protocol translation rules that are stored in a Multi-protocol Routing Database (MRD).

48. The method of claim 31 comprising determining whether message accounting service is required.

49. The method of claim 48 comprising, in response to determining that message accounting service is required, sending a third message to a message accounting subsystem.

50. The method of claim 49 wherein the third message is a copy of the first message.

51. The method of claim 49 wherein the third message is a Normalized Accounting Message (NAM) message that is based on information contained in the first message.

52. The method of claim 48 wherein determining whether message accounting service is required includes examining message accounting service rules that are stored in a MRD.

53. The method of claim 31 wherein applying the second transport protocol suite includes applying the second transport protocol suite at an outbound Multi-Protocol Link Interface Module (MLIM).

54. A computer program product comprising computer-executable instructions embodied in a computer-readable medium for performing steps comprising:
 a) receiving a first message formatted according to a first transport protocol suite and containing information formatted according to a first signaling protocol;
 b) performing a lookup in a multiprotocol routing database to determine protocol translation instructions for the first message;
 c) directing the first message to a translation process for generating a second message formatted according to second signaling protocol based on results from the lookup in the multiprotocol routing database;
 d) applying a second transport protocol suite to the second message; and
 e) transmitting the second message over a second network.

55. The computer program product of claim 54 wherein performing a lookup in the multiprotocol routing database includes determining whether accounting is required for the first message.

56. The computer program product of claim 55 comprising, in response to determining that accounting is required for the first message, formulating a normalized accounting message based on the accounting instructions.

57. The computer program product of claim 56 comprising routing the normalized accounting message to an accounting subsystem.

58. The computer program product of claim 54 wherein performing a lookup in the multiprotocol routing database includes performing the lookup using a point code contained in the first message.

59. The computer program product of claim 54 wherein performing a lookup in the multiprotocol routing database includes performing the lookup using a called party address contained in the first message.

60. The computer program product of claim 54 wherein performing a lookup in the multiprotocol routing database includes performing the lookup using an IP address contained in the first message.

61. The computer program product of claim 54 wherein performing a lookup in the multiprotocol routing database includes performing the lookup using a domain name contained in the first message.

\* \* \* \* \*

UNITED STATES PATENT AND TRADEMARK OFFICE
CERTIFICATE OF CORRECTION

PATENT NO. : 6,967,956 B1 Page 1 of 1
APPLICATION NO. : 09/618807
DATED : November 22, 2005
INVENTOR(S) : Tinsley et al.

It is certified that error appears in the above-identified patent and that said Letters Patent is hereby corrected as shown below:

Col. 15, line 8
 replace "Simple"
 with --Stream--.

Col. 15, line 17
 replace "Simple"
 with --Stream--.

Col. 16, line 37
 replace "Simple"
 with --Stream--.

Col. 16, line 46
 replace "Simple"
 with --Stream--.

Signed and Sealed this

Eighteenth Day of December, 2007

JON W. DUDAS
*Director of the United States Patent and Trademark Office*